United States Patent
Chand

(10) Patent No.: US 7,913,544 B1
(45) Date of Patent: Mar. 29, 2011

(54) SCANNING PROBE DEVICES AND METHODS FOR FABRICATING SAME

(75) Inventor: Ami Chand, Goleta, CA (US)

(73) Assignee: Applied NanoStructures, Inc., Santa Clara, CA (US)

( * ) Notice: Subject to any disclaimer, the term of this patent is extended or adjusted under 35 U.S.C. 154(b) by 645 days.

(21) Appl. No.: 11/985,622

(22) Filed: Nov. 15, 2007

Related U.S. Application Data

(60) Provisional application No. 60/859,344, filed on Nov. 15, 2006.

(51) Int. Cl.
*G01Q 70/16* (2010.01)

(52) U.S. Cl. .................. 73/105; 216/2; 216/11; 850/40; 850/60

(58) Field of Classification Search ............. 73/105; 850/40, 60

See application file for complete search history.

(56) References Cited

U.S. PATENT DOCUMENTS

| | | | |
|---|---|---|---|
| 4,943,719 A * | 7/1990 | Akamine et al. ............. 850/57 |
| 5,021,364 A | 6/1991 | Akamine et al. |
| 5,066,358 A | 11/1991 | Quate et al. |
| 5,399,232 A | 3/1995 | Albrecht et al. |
| 5,540,958 A | 7/1996 | Bothra et al. |
| 5,546,375 A | 8/1996 | Shimada et al. |
| 6,016,693 A | 1/2000 | Viani et al. |
| 6,156,216 A | 12/2000 | Manalis et al. |
| 6,452,171 B1 * | 9/2002 | Moloni ............. 850/57 |
| 6,886,395 B2 * | 5/2005 | Minne ............. 73/105 |
| 2002/0066855 A1 * | 6/2002 | Choi et al. ............. 250/234 |
| 2005/0210967 A1 | 9/2005 | Minne |
| 2005/0279729 A1 | 12/2005 | Okulan et al. |
| 2006/0254345 A1 | 11/2006 | King et al. |

* cited by examiner

*Primary Examiner* — Daniel S Larkin
(74) *Attorney, Agent, or Firm* — Charles S. Guenzer

(57) ABSTRACT

The present invention is directed to scanning probes in which a cantilever contacts a stylus via an integrated stylus base pad, and methods for fabricating such probes. The probe offer many advantages over other types of scanning probes with respect to eliminating the need for a soft, reflective coating in some applications and providing for the simple fabrication of sharp stylus tips, flexibility with respect to functionalizing the tip, and minimal thermal drift due to reduced bimorph effect. The advantage of these features facilitates the acquisition of high resolution images of samples in general, and particularly in liquids.

15 Claims, 8 Drawing Sheets

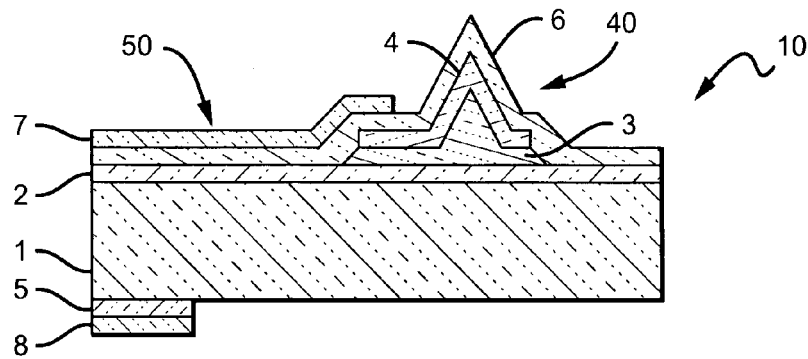
*FIG. 1E*
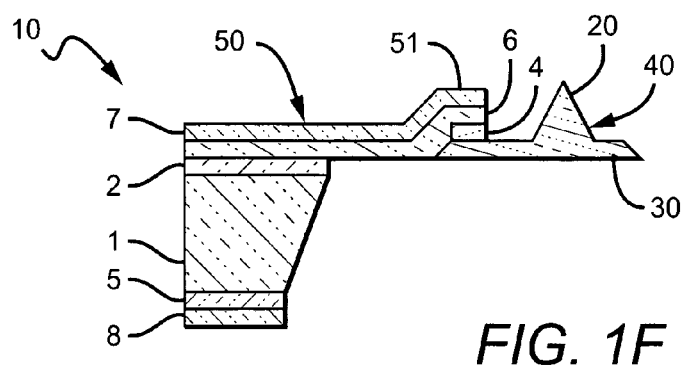
*FIG. 1F*
*FIG. 2A*
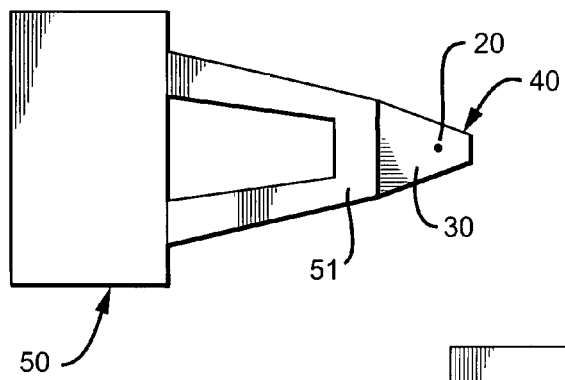
*FIG. 2B*
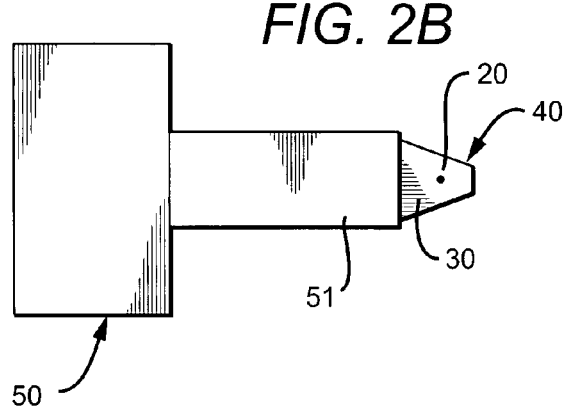

SCANNING PROBE DEVICES AND METHODS FOR FABRICATING SAME

CROSS REFERENCE TO RELATED APPLICATION

This application claims priority to the earlier provisional application entitled "Method of making scanning probes and process of batch manufacturing thereof," Ser. No. 60/859,344, filed Nov. 15, 2006, the disclosures of which are hereby incorporated herein by reference.

BACKGROUND

1. Field of the Invention

The present invention relates generally to surface probing devices and methods for making the devices and, more particularly, to the design and fabrication of scanning probes.

2. Description of the Related Art

Scanning Probe Microscopy (SPM) is a general term used to describe a growing number of techniques that use a sharp probe to scan over a surface and measure some property of that surface. The major advantage of scanning probe microscopy is that the resolution of the microscopes is not limited by diffraction, as is the case when using a beam of light or electrons, but only by the size of the probe-sample interaction volume (e.g. point spread function) which can be as small as a few picometers. The resolution obtainable with this technique can resolve atoms, and true 3-D maps of surfaces are possible.

Scanning probe microscopy covers several related technologies for imaging and measuring surfaces on a fine scale, down to the level of molecules and groups of atoms. At the other end of the scale, a scan may cover a distance of over 100 micrometers in the x and y directions and 20 micrometers in the z direction. This is an enormous range, and the development of this technology is having a profound effect on many areas of science and engineering.

Some examples of SPM technologies include STM (scanning tunneling microscopy), AFM (atomic force microscopy), scanning thermal microscopy (STHMP), Magnetic Force Microscopy (MFM), Electrostatic Force Microscopy (EFM), and Scanning Capacitance Microscopy (SCM). SPM technologies share the concept of scanning an extremely sharp tip, typically about 1-100 nm radius of curvature, across the surface of an object. An SPM image of a surface at the nanometer scale can, for example, be obtained by mechanically moving the probe or the sample in a raster scan of the specimen, line by line, and recording the probe-surface interaction as a function of position.

The scanning probe typically consists of a stylus, a cantilever arm and a mounting section. A scanning probe cantilever is a microscale bar, typically ranging in size from about 5 to about 500 micrometers, that bends when the associated stylus responds to a surface property on an object being scanned. The tip is usually a tapered silicon structure having a sharp apex that interacts with the surface being probed. The bottom or base of the tip is typically mounted on or otherwise integrated with a flexible cantilever, allowing the tip to follow the topography of the sample. When the tip moves in proximity to the investigated object, forces of interaction between the tip and the surface influence the movement of the cantilever. These movements are detected by selective sensors, and various types of interactions can be studied depending on the mechanics of the probe including dimensional and thermal properties. The tip is usually scanned relative to the sample, although sometimes the sample is scanned relative to the tip (e.g. the surface is scanned under the probe).

A surface probing device may also have an electrical connection from the stylus, through the cantilever arm, to external circuitry and/or a reflective coating on the cantilever arm. The electrical connection and the reflective coating can provide different ways to measure the response of the stylus apex to the surface being analyzed. A feedback mechanism is typically used to maintain the tip at a constant height above the sample during the scanning process. The tip can be modified in many ways in order to investigate different surface properties, and therefore the number of scanned probe techniques is constantly growing. For example, the tip may be coated with magnetic material or a conducting metal to image magnetic and electrical properties, respectively, of the sample using techniques known as Magnetic Force Microscopy (MFM) and Electrostatic Force Microscopy (EFM). Similarly, in Scanning Thermal Microscopy (STMP), a tip may have an integrated thermal sensing element to image thermal properties of the sample. The SPM tip-surface interaction can also be used to modify the sample to create small structures (nanolithography).

Scanning probes are typically manufactured out of silicon or silicon nitride materials. The silicon probes normally contain silicon tips and silicon cantilevers attached to a silicon substrate. The tips in the silicon probes are very sharp, typically less than about 10 nm radius of curvature. In addition to the tip sharpness, spring constant and frequency of the cantilever are important parameters to determine with respect to the application of a probe for a particular sample. For example, a biological sample might be better imaged with a soft cantilever (low spring constant, low frequency) and roughness on silicon wafer may be better imaged with a hard cantilever (high spring constant and high frequency). Since the cantilever thickness in silicon probes is usually controlled by an etching process, it is very difficult to control a fabricated cantilever thickness of less than about 1 µm of silicon with high percentage of yield and uniformity across the wafer.

On the other hand, the thickness of the cantilever in silicon nitride probes is controlled by a deposition process rather than an etching process, and a cantilever thickness of less than about 1 µm can be relatively easily achieved if the cantilever is fabricated from silicon nitride. U.S. Pat. No. 5,399,232 by Albrecht et al. describes fabrication silicon nitride cantilevers integrated with silicon nitride. The tip is molded out of an inverted pyramidal shape pit made in the silicon wafer; as a result, the tips suffer from poor sharpness. The radius of curvature of these tips is inherently large due to process limitations. U.S. Pat. Nos. 6,886,395 and 6,156,216 by Minne and Manalis et al. respectively describe methods of manufacturing probing devices having silicon nitride cantilever with an integrated silicon tip. The silicon tip in these methods is covered with silicon nitride except the apex. These methods have limitation of controlling exposure of the tip to uncover the apex.

Some bio-applications of the tips require the surface of the tip to be chemically modified, a process known as functionalization. For fictionalization to take place, the surface must be substantially exposed, and it needs to be either hydrophobic or hydrophilic. Properties of silicon material are better controlled and understood compared to silicon nitride. The silicon nitride surface is typically hydrophilic in nature and therefore has limited application with respect to tip functionalization. In addition, the exposed surface area of the tip in probes having cantilevers with integrated silicon tips is generally too small for functionalization.

Silicon nitride probes typically also require a reflective coating because the silicon nitride cantilevers are transparent to the laser that is reflected off the probe for measurement purposes such as imaging. A thin layer of metal is therefore coated on the probe to make it opaque to the laser in order to get a reflection. These cantilevers bend on nanometer scale when imaging in fluid due to a bimorph effect. The degree of bending is of the same order of the magnitude as of features in many samples useful for nanotechnology applications, thereby limiting the resolution of the probe. For example, resolving some minute biological entities such as virus particles in liquid, particularly those having sub-nanometer features, is difficult with metal coated cantilevers.

Information relevant to attempts to address these problems can be found in U.S. Pat. Nos. 6,156,246; 6,886,395; 5,066,358; 6,016,693; 5,021,364; 5,399,232; 5,540,958; and 5546375 as well as U.S. Patent Application Nos. 2006/0254345; 2005/0279729; and 2005/0210967. However, each one of these references suffers from one or more of the following disadvantages:

(1) an optional layer of metal must be deposited on the probe to facilitate or improve reflection;

(2) tips fabricated from silicon nitride are not sharp enough for many applications;

(3) tips fabricated from silicon nitride are limited with respect to tip functionalization; and (4) integrated silicon tips are difficult to fabricate, particularly with respect to controlling exposure of the apex.

SUMMARY OF THE INVENTION

Briefly, and in general terms, the present invention is directed to scanning probe structures that overcome these and other deficiencies, and methods for fabricating the probes. The advantages provided by such probes and methods can include probe designs in which a soft, reflective coating is optional and the tips may be extremely sharp, easy to fabricate, and display flexibility with respect to chemical modification, particularly functionalization.

In one aspect, a scanning probe is provided that includes a stylus with a tip component having an integrated base pad and a cantilever component which is attached to the base pad. In one embodiment, the free end of the cantilever is attached to the base pad. In another embodiment, the width of the integrated base pad is approximately equal to or greater than the width of the tip. In yet another embodiment, the cantilever and stylus can contain from be composed of different materials. In a further embodiment, the probe may contain an optional soft, reflective coating. In another embodiment, the probe may contain a heating member. In yet another embodiment, the stylus may include one or more carbon nanotubes.

In another aspect, a method for fabricating a scanning probe is provided in which a stylus with a tip component having an integrated base pad, and a cantilever component attached to the base pad, are fabricated on, and then released from, a substrate. In one embodiment, the free end of the cantilever is attached to the base pad. In another embodiment, the width of the integrated base pad is approximately equal to or greater than the width of the tip. In yet another embodiment, the cantilever and stylus may be fabricated from different materials. In a further embodiment, an optional soft, reflective coating may be deposited on the probe. In another embodiment, an optional heating member in contact with a doped tip can be fabricated. In yet another embodiment, the stylus may include one or more carbon nanotubes. In another embodiment, the tip can be sharpened.

In a further aspect, a method for fabricating a scanning probe stylus tip component having an integrated base pad can be fabricated. In one embodiment, the tip can be fabricated by growing or depositing one or more masking layers on a substrate and then patterning and etching the at least one stylus and the at least one integrated base pad. In one embodiment, the tip and integrated base component can be fabricated simultaneously using a single masking layer. In another embodiment, the tip can be sharpened.

In yet another aspect, a scanning probe stylus including a tip component having an integrated base pad is provided.

These and other aspects and advantages of the invention will become apparent from the following detailed description and the accompanying drawings, which illustrate by way of example the features of the invention.

BRIEF DESCRIPTION OF THE DRAWINGS

FIGS. 1A-F are schematic transverse cross sectional views illustrating one embodiment of the invention in which an integrated stylus base pad is fabricated onto a pre-fabricated stylus;

FIGS. 2A and 2B are schematic plan views of two embodiments of the invention, a scanning probe having a v-shaped cantilever and a scanning probe having a rectangular-shaped cantilever, respectively;

DETAILED DESCRIPTION OF THE INVENTION

Figure 1A:
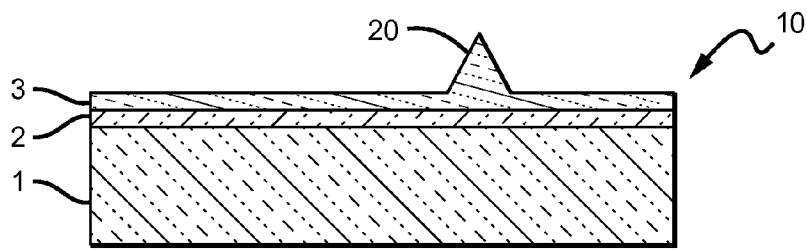

The following description presents preferred embodiments of the invention representing the best mode contemplated for practicing the invention. This description is not to be taken in a limiting sense but is made merely for the purpose of describing the general principles of the invention whose scope is defined by the appended claims.

The present invention provides scanning probes in which a cantilever contacts a stylus via an integrated stylus base pad, and methods for fabricating such probes. The probe offers many advantages over other types of scanning probes with respect to tip sharpness, optional reflective coating, flexibility with respect to functionalizing the tip, and minimal thermal drift due to reduced bimorph effect. These features facilitate the acquisition of high resolution images of samples in general, and particularly in liquids.

Other features and advantages of the invention will be apparent from the following detailed description when taken together with the drawings, and from the claims. The following description presents preferred embodiments of the invention representing the best mode contemplated for practicing the invention. This description is not to be taken in a limiting sense but is made merely for the purpose of describing the general principles of the invention whose scope is defined by the appended claims.

Before addressing details of embodiments described below, some terms are defined or clarified. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The following definitions refer to the particular embodiments described herein and are not to be taken as limiting; the invention includes equivalents for other undescribed embodiments.

As used herein, the term "attached" is intended to mean affixed to, including without limitation attachment via direct or indirect contact.

As used herein, the term "base pad" is intended to mean a thin layer of material underlying the base of a stylus member.

As used herein, the term "depositing" or "deposition" when referring to depositing materials on a substrate is intended to mean any viable method of deposition or application including without limitation evaporation, sputtering, layering, sprinkling, beading, extruding, patterning, spraying, or the application of a solid or semi-solid material such as a preform.

As used herein, the term "integrated" or "integral" when referring to a stylus base pad is intended to mean that the base pad is formed as a unit with the stylus. The stylus and the base pad may contain the same or different materials.

As used herein, the term "scanning probe" is intended to mean a probing device including a mounting block, a cantilever and a tip attached to the cantilever directly or indirectly at the free end of the cantilever. The tip typically has an apex of atomic dimensions for probing the physical properties of a surface on an object.

As used herein, the term "stylus" is intended to mean a pencil-shaped instrument that is used as an input device. A scanning probe stylus member typically has tapered structure bounded by a sharp apex on one end and a base on the other.

As used herein, the term "stylus assembly" is intended to mean a stylus comprising a tip having an integrated base pad.

As used herein, the term "substrate" is intended to mean the material in which a device is embedded or on to of which a device is fabricated.

As used herein, the term "substrate" is intended to mean a wafer that is the basis for subsequent processing operations in the fabrication of semiconductor devices or circuits. Examples of substrates include without limitation bulk silicon and SOI wafers.

As used herein, the term "wafer" is intended to mean a thin slice of semiconductor material, typically silicon, from which microchips are made.

Attention is now directed to more specific details of embodiments that illustrate but not limit the invention.

The present invention provides technologies and methods for fabricating scanning probes. In particular, the present invention provides a scanning probe having a cantilever arm attached to a stylus via an integrated stylus base pad.

FIGS. 1A-1D illustrate one embodiment of a method for fabricating a scanning probe stylus having an integrated base pad. In this embodiment, a stylus is patterned onto a substrate, as illustrated in FIG. 1A. The substrate is a bulk silicon or silicon-on-insulator (SOI) 10 material. The silicon may be 100-, 110- or 111-oriented and p-type or n-type doped. The silicon insulator SOI wafer generally consists of silicon (Si) 1, buried silicon dioxide 2 and device silicon 3. By way of comparison, a silicon wafer (bulk silicon) has no intermediary oxide layer. In this embodiment, a masking layer (not shown) can first be deposited or grown on the surface of the device silicon layer 3. The masking layer may be formed by growing silicon dioxide, but any suitable growth/deposition technology or material could be used including without limitation chemical vapor deposited oxide, nitride or metal. This masking layer is required for etching the device silicon layer 3 to fabricate the stylus tip 20. The tip pattern can then be transferred to the masking layer using lithography, including without limitation a standard lithography process such as coat photoresist, pre-bake, expose, develop, and post bake. The masking layer can then be patterned for tip formation using any suitable etchant, including without limitation buffered oxide etchant (BOE), and the device silicon layer 3 in the substrate 10 subsequently etched by the resulting tip mask to produce the tip 20. The fabricated tip can be of any suitable shape, including without limitation a cone-shaped tip with sharp apex as illustrated in FIG. 1A. Etchants suitable for tip formation include without limitation anisotropic etchants such as KOH, EDP, TMAH or a dry etching process. In another embodiment, a combination of wet and dry etch can be used to form a sharp apex on the tip 20. In yet another embodiment, photoresist may be used as a masking layer in a dry etch process, in which case the extra masking layer described above (not shown) may not be required.

Figure 1B:
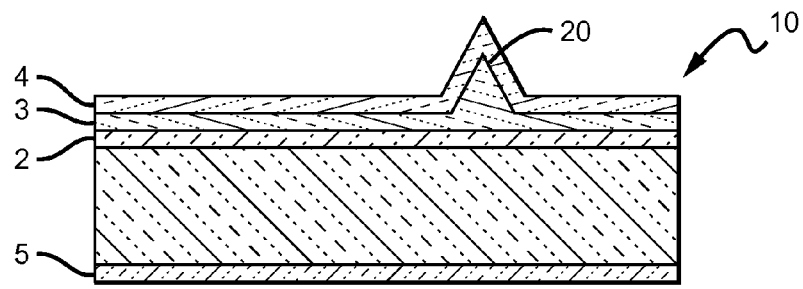

The stylus tip 20 in this embodiment can then be sharpened using a thermal oxidation process, as shown in FIG. 1B. A thermal oxide layer 4 can be grown on the tip 20 and exposed device silicon layer 3 at temperatures from about 900° C. to about 1050° C. A second thermal oxide layer 5 may be grown simultaneously on the backside of the wafer 1 during this process.

Figure 1C:
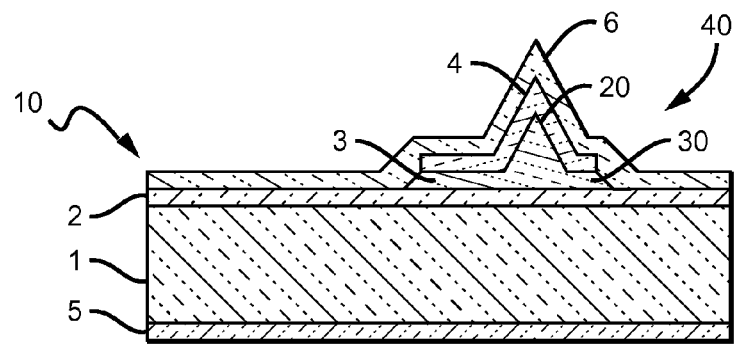

This thermal oxide layer 4 can also be used as a mask for etching the device silicon layer 3 to define a base pad 30 for the tip 20, as illustrated in FIG. 1C. A lithography step such as that described above for FIG. 1A can then be performed to pattern the oxide layer 4, after which the oxide layer 4 may be etched to define a stylus base pad 30 adjacent to the stylus tip 20. The base pad 30 can be formed by etching the device silicon layer 3 using the thermal oxide layer 4 as mask. The device silicon layer 3 may be etched using processes similar to the formation of the stylus tip 20 and having a planar layer laterally extending in both directions from the bottom of the tip 20. The base pad 30 is thereby formed as an integral part of the tip 20. The wafer 10 can subsequently be cleaned and a fresh layer of silicon dioxide 6 can then be grown to cover the exposed areas of the device silicon layer 3 on the integrated stylus assembly 40 which includes the tip 20 and integrated base pad 30, as illustrated in FIG. 1C. Other materials are also suitable for this purpose, including without limitation silicon nitride. Suitable materials for use in the thermal oxide layer 4 include without limitation silicon dioxide.

The base pad 30 fabricated in this embodiment is therefore integrated into the tip, thereby forming an integrated stylus assembly 40 having a tip component and a base pad component. The vertical sides of the base pad can be of any suitable shape, including without limitation perpendicular or oblique. The thickness of the base pad can range from about 20 nm to about 15 um depending upon process and the scanning application. The size of the stylus base pad can be varied to meet the needs of any one particular technology. The width of the base pad can be larger than or about the same width as the lower edge of the stylus tip to which it is attached. It may also be noncontiguous.

Figure 1D:
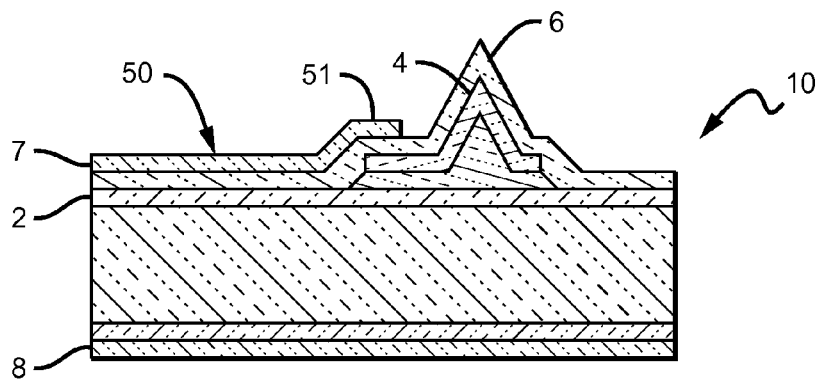

Fabrication of the cantilever can then be achieved by depositing, patterning, and etching a layer of cantilever material. Any suitable cantilever material can be deposited or grown, including without limitation a low stress silicon nitride deposited using a chemical vapor deposition (CVD) process. FIG. 1D depicts a substrate wafer after a layer of cantilever material 7 is deposited and patterned on the front side of the wafer to form the cantilever 50. In one embodiment, layers of cantilever material 7 and 8 can be deposited on the both the front and back sides of the wafer 10, respectively as illustrated in FIG. 1D. A lithography step can subsequently be performed on the front side layer 7 of the wafer to pattern the cantilever shape into a photoresist layer (not shown). The front side layer 7 containing cantilever material can then be etched to form the cantilever member 50 using any suitable technology, including without limitation a dry etch process in a reactive ion etching system or a wet chemical etching process. Any suitable masking material may be used, including without limitation photoresist, PECVD deposited oxide, PECVD nitride or combinations thereof. Fabrication of the cantilever 50 can be achieved by an etch stop at the silicon dioxide layer 6, leaving the tip 20 covered with only silicon dioxide 6, as illustrated in FIG. 1D. The cantilever 50 thickness is typically the thickness of the deposited cantilever material 7. A small portion of the free end 51 of the cantilever 50 overlaps onto the stylus base pad 30. This overlap region attaches the integrated stylus assembly 40 to the cantilever 50.

FIG. 1E illustrates the device after backside lithography of the wafer 10. The mounting block or holder pattern (not shown) is first aligned with respect to the cantilever 50 and integrated stylus assembly 40 on top of the wafer 10. This alignment can be performed using backside mask alignment or any other suitable alignment technique. The backside mask aligner may use any suitable technology to align the structures from the top of the wafer 10 to the bottom, or from front to back, including without limitation the use of infra red or image capture and alignment techniques. The pattern can then be transferred to the mask (not shown) using lithography followed by etching of silicon nitride 8 and thermal oxide 5 layers. The silicon dioxide layer 6 on the front of the wafer can, at this stage of processing, help in protecting the stylus assembly 40 and, in particular, the stylus tip component 20 during the final step of release.

FIG. 1F illustrates the wafer 10 after the final release. The silicon 1 is etched from the back side. This etch step can be achieved by any suitable means, including without limitation in KOH, TMAH, EDP or using dry etch processes. The etch step can be stopped at the buried silicon dioxide layer 2. The buried oxide layer 2 and the oxide layer 6 covering the stylus assembly 40 can then be etched using any suitable medium, including without limitation buffered HF. The free end 51 of the nitride cantilever 50 and the stylus base pad 30 in this embodiment are attached via the oxide layer 6. The cantilever 50 may also be attached directly to the stylus base pad, without oxide as a medium, if bulk silicon (not shown) is used as a substrate 10.

FIGS. 2A and 2B illustrate top views of two different types of cantilever structures which can be provided by embodiments of the present invention after release, v-shaped and rectangular shaped cantilevers, respectively. In these embodiments, the free end 51 of the cantilever 50 is attached to the integrated base pad 30 component, and associated tip 20 of the integrated stylus tip 40.

Figure 3A:
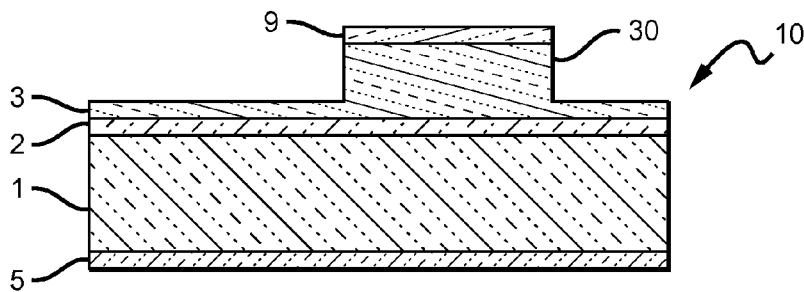
FIGS. 3A-3C are schematic transverse cross sectional views illustrating one embodiment of the invention in which a step etch process is used to define an integrated stylus base pad before a stylus is fabricated.
Figure 3B:
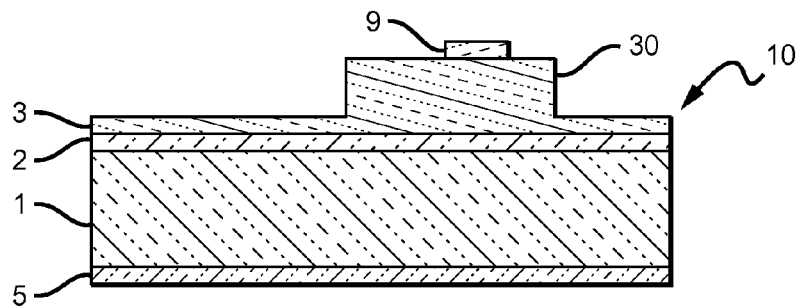
Figure 3C:
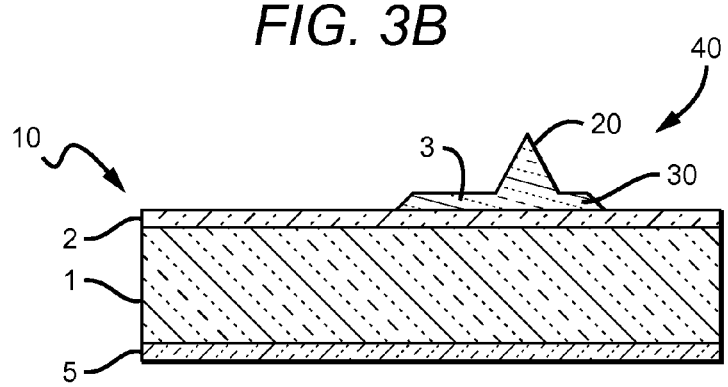

Alternative process sequences for forming a stylus having an integrated base pad are also possible. In several such alternative embodiments, the base pad is etched before the tip as illustrated in FIGS. 3A-C. In one embodiment, a masking layer 9 is grown or deposited onto a SOI wafer 10, the masking layer 9 is patterned to define the stylus base pad 30, and the device silicon layer 3 is etched. The device silicon layer 3 etching is stopped before it reaches the buried oxide layer 2, thereby creating a step structure in the silicon layer 3 as illustrated in FIG. 3A. A step structure of this type can be similarly fabricated if bulk silicon is used instead of SOI. The masking layer 9 is then patterned to define the tip 20 using a lithography process, and then the device silicon layer 3 is etched to fabricate the tip 20 and the integrated stylus base pad 30 simultaneously, as shown in FIG. 3C. In the case of an SOI wafer, the etch stops at the buried oxide layer 2. If bulk silicon is used, it will form a step in the silicon 1.

Figure 4A:
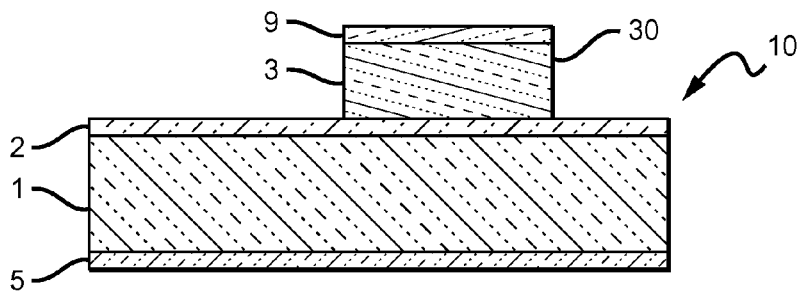
FIGS. 4A-C are schematic transverse cross sectional views illustrating one embodiment of the invention in which an etch stop process is used to define an integrated stylus base pad before a stylus is fabricated.
Figure 4B:
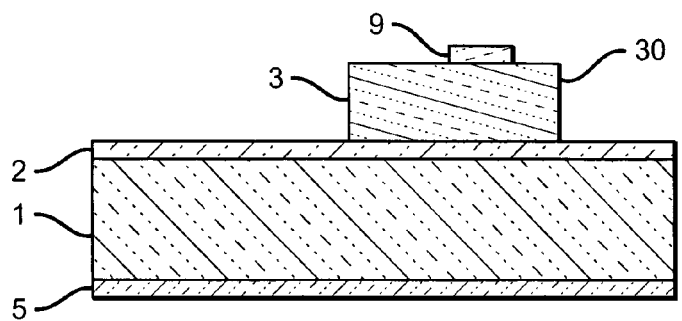
Figure 4C:
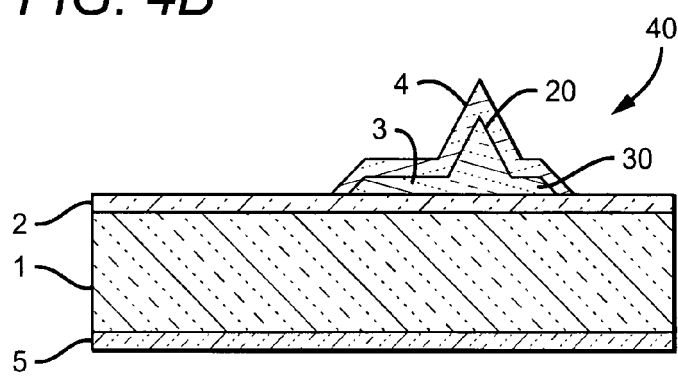

Another alternative embodiment for forming a stylus having an integrated base pad is illustrated in FIGS. 4A-C. This process is similar to that illustrated in FIGS. 3A-C except that the device silicon layer 3 in this embodiment is etched until it is stopped at the buried oxide layer 2. The masking layer 9 is then patterned using a lithography process to define the tip 20, as shown in FIG. 4B. The tip 20 and the integrated stylus base pad 30 can then be etched simultaneously to form the integrated stylus assembly 40 as illustrated in FIG. 4C. The tip 20 can thereafter be sharpened using a thermal oxidation process by first growing an oxide layer 4 as illustrated in FIG. 1B, followed by a thermal oxidation. The wafer at this stage, for example, is similar to that illustrated in FIG. 1C and subsequent processing can be completed as described for FIGS. 1D-1F.

After the cantilevers are released, an optional layer of metal can be deposited on the probe to improve reflection in some types of applications, including without limitation laser detection systems. In some embodiments, however, a metal layer deposited on nitride can lead to a bimorph effect which may compromise the resolution or other properties of the scanning procedure such as imaging. In contrast, the large stylus base pad in the present invention may be used for laser reflection without coating an additional layer of metal, thereby improving the surface probing features of the probe.

Figure 5A:
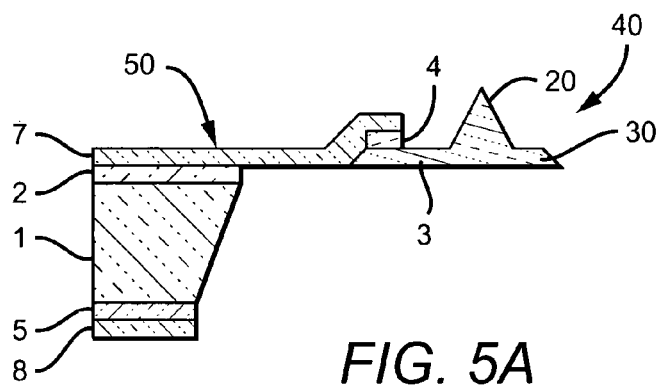
FIG. 5A is a schematic transverse cross sectional view illustrating one embodiment of the invention, a scanning probe in which a nitride cantilever and a silicon stylus having an integrated base pad are fabricated onto an SOI wafer, and the cantilever is in direct contact with at least one portion of the integrated stylus base pad.
Figure 5B:
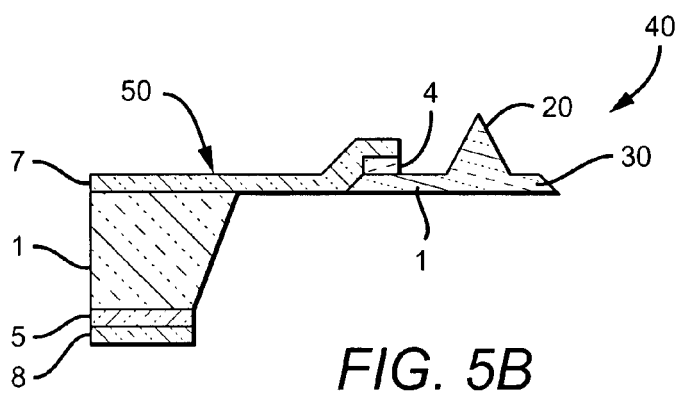
FIG. 5B is a schematic transverse cross sectional view illustrating one embodiment of the invention, a scanning probe in which a nitride cantilever and a silicon stylus having an integrated base pad are fabricated onto a bulk silicon wafer such that the cantilever is in direct contact with at least one portion of the integrated stylus base pad.

In another embodiment, the second oxidation step using the oxide layer 6 illustrated in FIG. 1C can be eliminated, resulting in a probe structure of the type illustrated in FIG. 5A. This probe includes a nitride cantilever 50 on a SOI silicon substrate 1 in which the cantilever 50 is in direct contact with the integrated stylus base pad 30 at one or more points as shown in FIG. 5A. In yet another embodiment, the probe may be fabricated on bulk silicon as illustrated in FIG. 5B. In this embodiment, the buried oxide 2 and device silicon layer 3 layers originating from the SOI wafer are absent from the bulk silicon substrate and therefore from the fabricated probe.

Figure 5C:
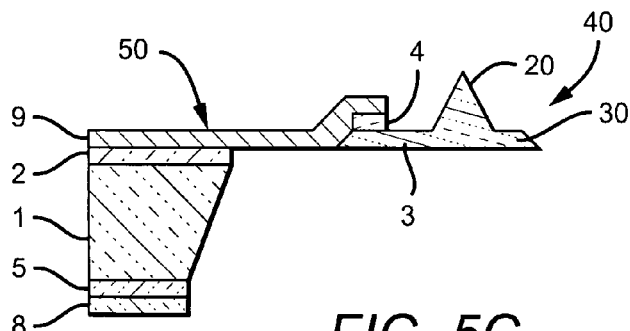
FIG. 5C is a schematic transverse cross sectional view illustrating one embodiment of the invention, the scanning probe illustrated as FIG. 5B in which the cantilever is fabricated from a material that is not a nitride, such as metal.

The cantilever may be fabricated from any suitable material, including without limitation one or more of silicon nitride, GaN, SiC, tungsten carbide, diamond films, and other nitride or carbide compounds. Suitable metals may also be used, including without limitation Al, Au, Pt, W, etc. A cross-sectional view of a final, released metal cantilever is shown in FIG. 5C. The stylus material can include silicon, and the stylus tip 20 can be integrated with carbon nanotubes (not shown) in the process, in which case the silicon may be deposited with a catalyst and one or more carbon nanotubes then deposited, attached or grown.

Figure 6A:
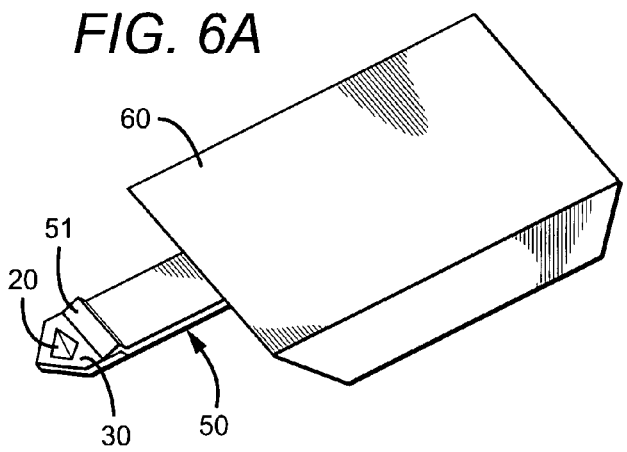
FIGS. 6A-6B are schematic perspective views of two embodiments of the invention, a scanning probe having a rectangular-shaped cantilever and a scanning probe having a v-shaped cantilever, respectively.
Figure 6B:
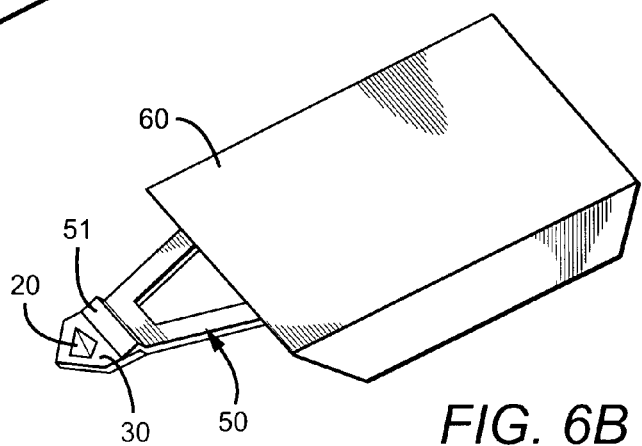

FIGS. 6A-6B illustrate perspective views of two types of devices having integrated base pads, a rectangular-shaped probe and a v-shaped probe, respectively. The fixed end of the cantilever 50 is attached to a mounting block or holder 60 and the free end 51 of the cantilever is attached to the integrated stylus base pad 30 in both embodiments.

Figure 7:
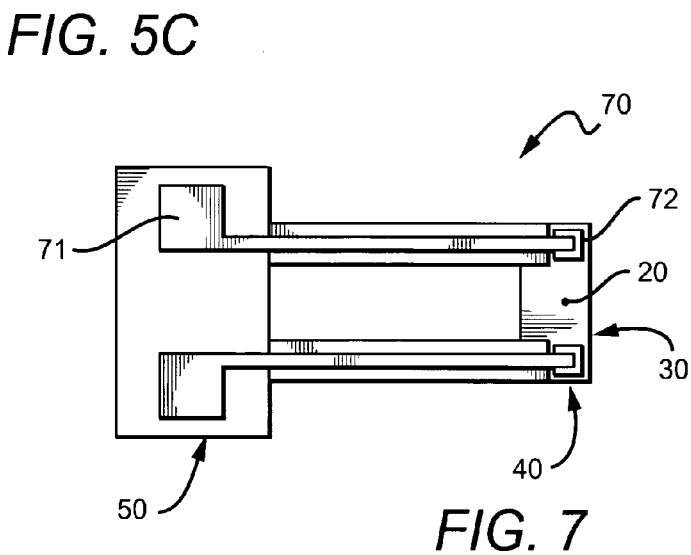
FIG. 7 is a schematic plan view illustrating one embodiment of the invention, a probe having a metal contact for heating the stylus or to measure thermal properties.

FIG. 7 illustrates another embodiment, a device 70 having an integrated base pad 30 in which the tip 20, the base pad 30, or both can be used as a heater. This can be achieved by selecting an appropriate doping of the device silicon layer 3, or using a diffusion or ion implantation process to modify the base resistivity of the device silicon layer 3. The heater ends (not shown) can be connected via metal lines 71 through contacts 72 which can be defined by heavy ion implant doping or diffusion of impurities such phosphorus or boron. Metal lines (not shown) can then be connected from the heater. The metal lines 71 can be used to apply a potential to pass a current to heat the integrated stylus 40, particularly the stylus tip component 20. This type of embodiment can be used for studying the thermal properties of materials.

Figure 8:
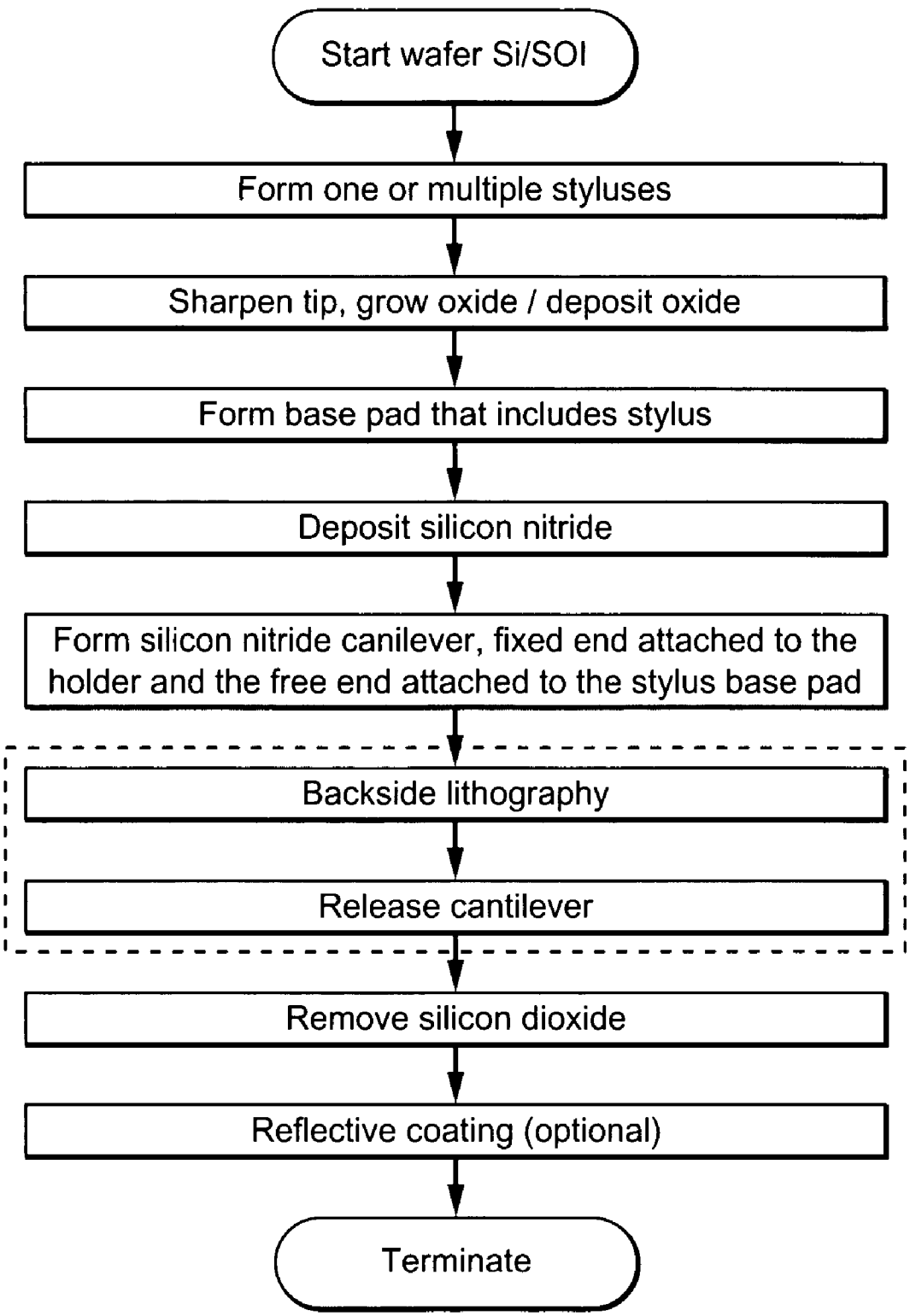
FIG. 8 is a flow chart illustrating one embodiment of the invention, a method for fabricating a scanning probe having a silicon nitride cantilever attached to an integrated stylus base pad containing silicon. The method includes releasing the probe from the wafer using backside lithography followed by a release process.
Figure 9:
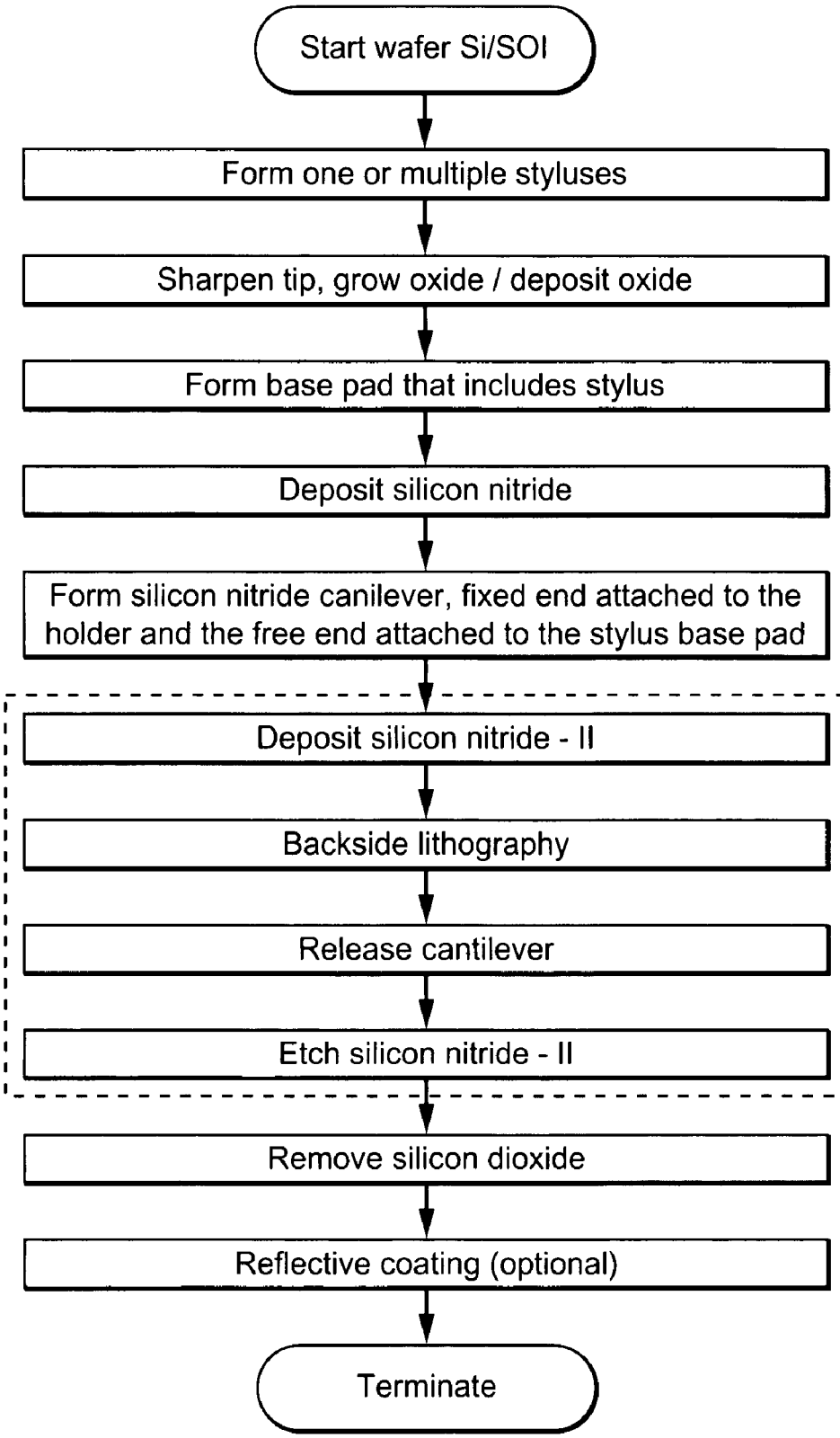
FIG. 9 is a flow chart illustrating one embodiment of the invention, a method for fabricating a scanning probe having a silicon nitride cantilever attached to an integrated stylus base pad containing silicon. The method includes releasing the probe from the wafer by depositing a second layer of silicon nitride onto the probe, backside lithography followed by a release process, and subsequent etching of the second silicon nitride layer.
Figure 10:
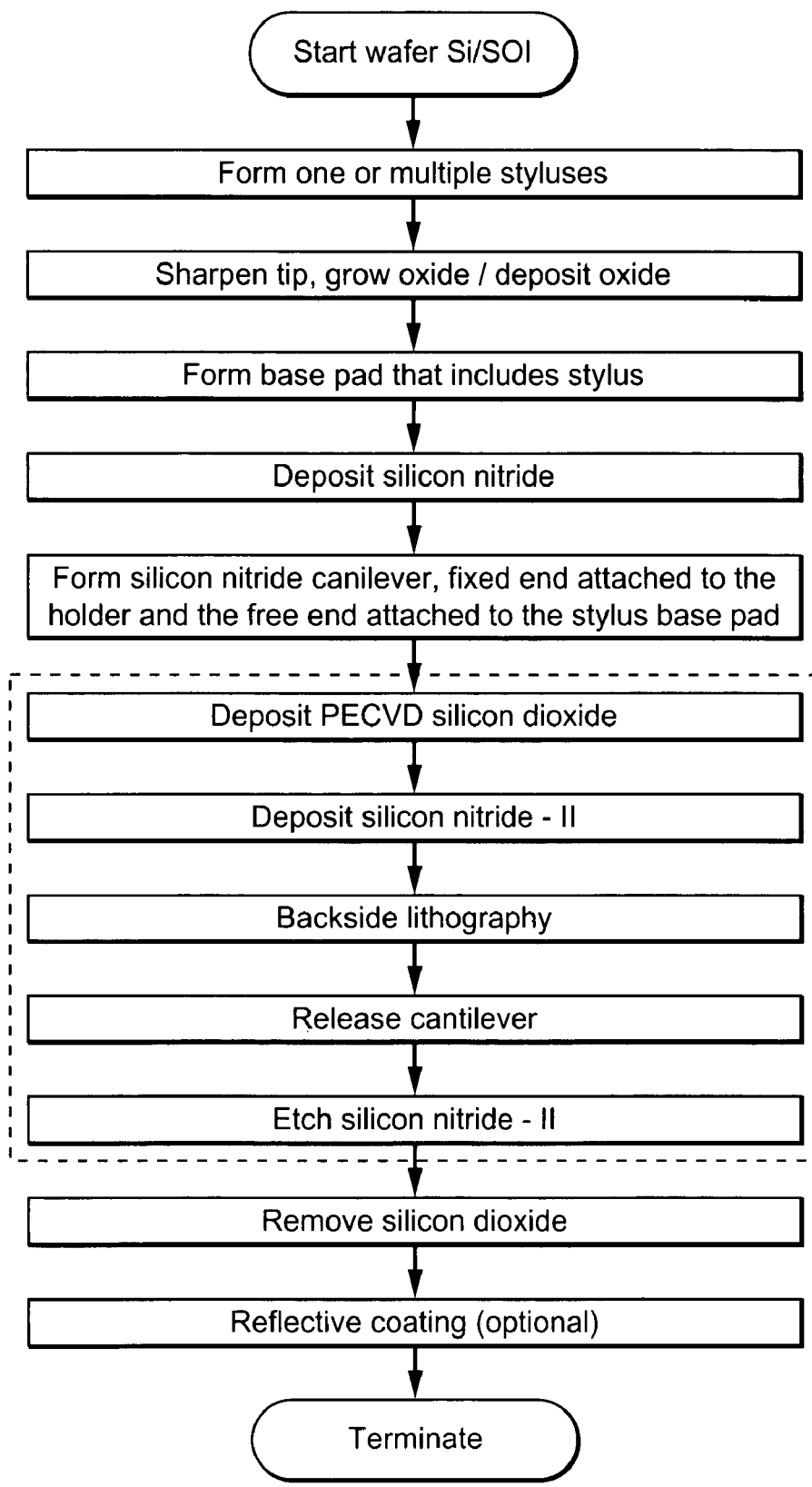
FIG. 10 is a flow chart illustrating one embodiment of the invention, a method of fabricating a scanning probe having a silicon nitride cantilever attached to an integrated stylus base pad containing silicon. The method includes releasing the probe from the wafer by PECVD of silicon nitride followed by depositing a second layer of silicon nitride onto the probe, backside lithography, a release process, and subsequent etching of the second silicon nitride layer.

FIGS. 8-10 are process flow charts for fabricating similar scanning probes using different process sequences. The alternative process steps in each embodiment are delineated by hatched boxes in each figure, and each process uses a silicon dioxide (oxide) mask to protect the stylus during fabrication. FIG. 8 describes one embodiment, a process flow for fabricating a probe having a silicon nitride cantilever when using silicon dioxide as a protection mask for final release. The process includes probe fabrication followed by backside lithography and release of the cantilever, after which the protective silicon dioxide mask is removed and a reflective coating may be added. FIG. 9 describes another, similar embodiment where a second layer of nitride (nitride—II) deposited on the probe, overlying the protective oxide layer, is used for final release. In this process, the cantilever nitride and the nitride deposited as a mask during the final release (nitride—II) are touching each other and therefore the second nitride layer etch is timed stopped. FIG. 10 describes yet another similar embodiment, a variation of the sequence described in FIG. 9 in which a protective oxide layer can be deposited between the cantilever nitride and the final release mask nitride (nitride-II). One advantage of this approach is that the nitride—II etch is stopped at the oxide layer without risk of damaging the cantilever nitride.

A scanning probe device according to the invention can be fabricated on any suitable substrate, including without limitation a silicon or silicon-on-insulator (SOI) wafer. The silicon in the wafer may be n-type doped, p-type doped, or un-doped. A wider variety of materials are suitable for fabricating cantilevers, including without limitation nitrides and metals. The cantilever nitride and/or Nitride-II layer in the process outlined in FIG. 8, for example, can be replaced with metal or other materials, such as GaN, SiC, diamond-like carbon, diamond and the like.

The stylus member may have a range of dimensions depending upon the particular application, including without limitation a height of ranging from about 0.1 μm to about 100 μm, a diameter ranging from about 1 nm to about 100 um, a area of about 1 square nm to about 10000 square μm, and a radius of curvature from about 10 nm to about 1 um. Any suitable material or combination thereof may be used for the tip component of the stylus, including without limitation silicon.

The embodiments and examples set forth herein were presented to explain the nature of the present invention and its practical application, and thereby to enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, while the design and fabrication of a scanning probe having one silicon nitride cantilever and one integrated silicon stylus fabricated on a SOI substrate is described herein, the invention contemplated is not so limited. One skilled in the art will recognize that the invention may potentially be applied to other types of structures such as probes or substrates having more than one stylus or cantilever, or made of other suitable materials, for example, without departing from the spirit and scope of the invention as defined in the appended claims.

I claim:

1. A method for fabricating a scanning probe, the method comprising:
   providing at least one substrate;
   a first step of fabricating at least one silicon stylus member on an upper portion of the at least one substrate, wherein the at least one silicon stylus member comprises (1) a tip having an apex and a base and a base pad integrated with the tip, partially vertically disposed under the base, and including first and second portions extending in opposed horizontal directions from the base;
   depositing a cantilever material on the substrate including over at least a portion of the first portion of the base pad;
   a second step of fabricating in the cantilever material at least one cantilever member onto the at least one substrate, wherein at least one portion of the at least one cantilever member is vertically attached to a top surface of the first portion of the integrated base pad on the at least one stylus member; and
   releasing the at least one stylus member and at least one cantilever member from the substrate.

2. The method of claim 1, wherein the at least one substrate is selected from the group consisting of a silicon wafer, a SOI wafer, and a glass wafer.

3. The method of claim 1, wherein the at least one portion of the at least one cantilever member comprises a free end of the at least one cantilever member.

4. The method of claim 1, wherein the at least one cantilever member comprises at least one material selected from the group consisting of silicon nitride, gallium nitride, silicon carbide, tungsten carbide, a diamond film, a metal, and an alloy thereof.

5. The method of claim 1, wherein the width of the integrated base pad is greater than the width of the base of the tip.

6. The method of claim 1, further comprising:
   doping the at least one stylus member; and
   fabricating at least one heating member comprising metal on the at least one substrate, wherein the at least one heating member is in contact with the at least one cantilever member and the at least one stylus member.

7. The method of claim 1, further comprising coating at least one of the at least one stylus member or the at least one cantilever with at least one reflective metal.

8. The method of claim 1, further comprising forming at least one thermal oxidation layer on the at least one tip.

9. A scanning probe fabricated according to claim 1.

10. The method of claim 1, further comprising sharpening the at least one stylus member.

11. The method of claim 1, wherein the integrated base pad underlies only a free end of a respective one of the at least one cantilever member.

12. The method of claim 1, further comprising thermally oxidizing the stylus member prior to the depositing step.

13. The method of claim 1, wherein, after the second fabricating step, the cantilever material overlies the first portion but not the second portion of the base pad.

14. A method of fabricating a scanning probe, comprising the steps of:
    forming in a silicon portion of a substrate a silicon stylus member comprising a tip having an apex and a base and a base pad integrated with the tip and including first and second portions extending opposed horizontal directions from the base;
    thermally oxidizing the tip and the base pad forming a silicon oxide layer and thereby sharpening the tip;
    depositing a cantilever material on the substrate including at least a third portion of the first portion of the base pad;
    fabricating in the cantilever material a cantilever member which is vertically attached to a top surface of the first portion of the base pad; and
    releasing the stylus member and the cantilever member from the substrate.

15. The method of claim 14, further comprising removing the silicon oxide layer from all but a third portion of silicon oxide layer overlying the first portion of the base pad, from the tip, and from the second portion of the base pad.

* * * * *